United States Patent
Garg et al.

(10) Patent No.: US 9,256,470 B1
(45) Date of Patent: Feb. 9, 2016

(54) JOB ASSIGNMENT IN A MULTI-CORE PROCESSOR

(71) Applicant: EMPIRE TECHNOLOGY DEVELOPMENT LLC, Wilmington, DE (US)

(72) Inventors: Siddharth Garg, Waterloo (CA); Bharathwaj Raghunathan, Waterloo (CA)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/447,216

(22) Filed: Jul. 30, 2014

(51) Int. Cl.
G06F 9/46 (2006.01)
G06F 9/50 (2006.01)

(52) U.S. Cl.
CPC ............ G06F 9/5027 (2013.01); G06F 9/5094 (2013.01)

(58) Field of Classification Search
CPC ...................................................... G06F 9/5027
USPC ................................................. 718/101–108
See application file for complete search history.

(56) References Cited

U.S. PATENT DOCUMENTS

| | | | |
|---|---|---|---|
| 8,015,564 B1 * | 9/2011 | Beyer ....................... | G06F 9/505 718/100 |
| 2008/0052714 A1 * | 2/2008 | Wong ..................... | G06F 9/5027 718/102 |
| 2009/0307703 A1 * | 12/2009 | Archer .................. | G06F 9/5027 718/104 |
| 2011/0004883 A1 * | 1/2011 | El-Moursy et al. ... | G06F 9/4881 718/103 |
| 2012/0066683 A1 * | 3/2012 | Srinath ................. | G06F 9/4887 718/102 |
| 2012/0159074 A1 | 6/2012 | Sodhi et al. | |
| 2014/0068621 A1 * | 3/2014 | Sitaraman ............... | G06F 9/505 718/102 |

OTHER PUBLICATIONS

Kumar, R., Tullsen, D. M., Ranganathan, P., Jouppi, N. P., & Farkas, K. I. (Jun. 2004). Single-ISA heterogeneous multi-core architectures for multithreaded workload performance. In ACM SIGARCH Computer Architecture News (vol. 32, No. 2, p. 64). IEEE Computer Society.*

Lakshmanan, K., Kato, S., & Rajkumar, R. (Nov. 2010). Scheduling parallel real-time tasks on multi-core processors. In Real-Time Systems Symposium (RTSS), 2010 IEEE 31st (pp. 259-268). IEEE.*

Coskun, A. K., Strong, R., Tullsen, D. M., & Simunic Rosing, T. (Jun. 2009). Evaluating the impact of job scheduling and power management on processor lifetime for chip multiprocessors. In ACM SIGMETRICS Performance Evaluation Review (vol. 37, No. 1, pp. 169-180). ACM.*

(Continued)

*Primary Examiner* — Satish Rampuria

(74) *Attorney, Agent, or Firm* — Moritt Hock & Hamroff LLP; Steven S. Rubin, Esq.

(57) ABSTRACT

Technologies are generally described for methods and systems effective to assign a job to be executed in a multi-core processor that includes a first set of cores with a first size and a second set of cores with a second size different from the first size. The multi-core processor may receive the job at an arrival time and may determine a job arrival rate based on the arrival time. The job arrival rate may indicate a frequency that the multi-core processor receives a plurality of jobs. The multi-core processor may select the first set of cores and may select a degree of parallelism based on the job arrival rate and based on a performance metric relating to execution of the job on the first set of cores. In response to the selection, the multi-core processor may assign the job to be executed on the first set of cores.

17 Claims, 6 Drawing Sheets

(56) References Cited

OTHER PUBLICATIONS

Turakhia, Y. et al., "HaDeS: Architectural synthesis for heterogeneous dark silicon chip multi-processors," Design Automation Conference (DAC), 2013 50th ACM / EDAC / IEEE , May 29, 2013-Jun. 7, 2013, pp. 1,7.

Almeida, R. B. et al., "On the evolution of Wikipedia," in International Conference on Weblogs and Social Media, ICWSM, 2007, pp. 8.

Amdahl, G.M., "Validity of the Single Processor Approach to Achieving Large-Scale Computing Capabilities," Spring Joint Computer Conference, AFIPS, Apr. 18-20, 1967, pp. 483-485.

Barroso, L. A. and Holzle, U., "The Case for Energy-Proportional Computing," Computer, 2007, pp. 33-37, vol. 40, No. 12.

Carlson, T.E., et al., "Sniper: Exploring the Level of Abstraction for Scalable and Accurate Parallel Multi-Core Simulation," 2011 International Conference for High Performance Computing, Networking, Storage and Analysis (SC), 2011, pp. 1-12.

Chen, Y. et al., "The Case for Evaluating Mapreduce Performance Using Workload Suites," In Proceedings of the 2011 IEEE 19th Annual International Symposium on Modelling, Analysis, and Simulation of Computer and Telecommunication Systems, MASCOTS '11, 2011, pp. 390-399. E.

Esmaeilzadeh, H. et al., "Dark Silicon and the End of Multicore Scaling," Proceedings of the 38th annual international symposium on Computer architecture, 2011, pp. 365-376.

Falsafi, B., "VISA: Vertically Integrated Server Architecture," Accessed at http://web.archive.org/web/20130312033001/http://parsa.epfl.ch/visa/, Accessed on Jun. 23, 2014, 3 pages.

Feng, H. et al., "Optimal State-Free, Size-aware Dispatching for Heterogeneous M/G/-type systems," 24th International Symposium on Computer Performance, Modeling, Measurements and Evaluation, Apr. 2005, pp. 1-25, vol. 62, No. 1-4.

Hardavellas, N. et al., "Toward Dark Silicon in Servers," Micro, IEEE, 2011, pp. 6-15, vol. 31, No. 4.

Kumar, R. et al., "Single-Isa Heterogeneous Multi-Core Architectures for Multithreaded Workload Performance," In ACM SIGARCH Computer Architecture News, IEEE Computer Society, 2004, pp. 64-75, vol. 32, No. 2.

Li, J. and Martinez, J. F., "Dynamic Power-Performance Adaptation of Parallel Computation on Chip Multiprocessors," The Twelfth International Symposium on High-Performance Computer Architecture, 2006, pp. 77-87.

Li, S. et al., "An Integrated Power, Area, and Timing Modeling Framework for Multicore and Manycore Architectures," 42nd Annual IEEE/ACM International Symposium on Microarchitecture, 2009, MICRO-42 , pp. 469-480.

Lotfi-Kamran, P. et al., "Scale-out processors," In Proceedings of the 39th Annual International Symposium on Computer Architecture, ISCA '12, 2012, pp. 500-511.

Rahm, E., "Dynamic Load Balancing in Parallel Database Systems," in Euro-Par'96 Parallel Processing, 1996, pp. 37-52.

Raman, A. et al., "Parallelism Orchestration Using Dope: The Degree of Parallelism Executive," In ACM SIGPLAN Notices, 2011, pp. 26-37, vol. 46.

Ramaswamy, S. and Yalamanchili, S., "Improving Cache Efficiency Via Resizing+ Remapping," 25th International Conference on Computer Design, ICCD, 2007, pp. 47-54.

Shelepov, D. et al., "Hass: A Scheduler for Heterogeneous Multicore Systems," ACM SIGOPS Operating Systems Review, 2009, pp. 66-75, vol. 43, No. 2.

Venkatesh, G. et al., "Conservation Cores: Reducing the Energy of Mature Computations," In ASPLOS 2010: Architectural Support for Programming Languages and Operating Systems, 2010, pp. 14.

Woo, S. C. et al., "The Splash-2 Programs: Characterization and Methodological Considerations," In Proceedings of the 22nd annual international symposium on Computer architecture, ISCA '95, 1995, pp. 24-36.

Zhang, Z. and Daigle, J. "Analysis of job assignment with batch arrivals among heterogeneous servers," European Journal of Operational Research, 2012, pp. 149-161, vol. 217, No. 1.

* cited by examiner

JOB ASSIGNMENT IN A MULTI-CORE PROCESSOR

BACKGROUND

Unless otherwise indicated herein, the materials described in this section are not prior art to the claims in this application and are not admitted to be prior art by inclusion in this section.

Datacenters may include one or more servers that may include multi-core processors. Jobs received at the datacenter may be assigned to cores within the multi-core processors based on a scheduling mechanism of a respective server. In some examples, the scheduling mechanism may schedule jobs to be executed on different cores in parallel.

SUMMARY

In some examples, methods for assigning a job to be executed in a multi-core processor are generally described. The methods may include receiving, by the multi-core processor, the job at the multi-core processor at an arrival time. The multi-core processor may include a first set of cores with a first size. The multi-core processor may also include a second set of cores with a second size different from the first size. The job may include a request to execute a set of instructions. The methods may also include determining, by the multi-core processor, a job arrival rate of the job based on the arrival time of the job. The job arrival rate may indicate a frequency that the multi-core processor receives a plurality of jobs including the job. The methods may also include selecting, by the multi-core processor, a degree of parallelism based on the job arrival rate and based on a performance metric. The degree of parallelism may relate to a number of parallel threads associated with execution of the request. The performance metric may relate to the execution of the job on the first set of cores using the degree of parallelism. The methods may also include selecting, by the multi-core processor, the first set of cores based on the job arrival rate and based on a performance metric. The methods may also include, in response to the selection of the first set of cores, assigning, by the multi-core processor, the job to be executed on the first set of cores.

In some examples, systems effective to assign a job to be executed in a multi-core processor are generally described. The system may include the multi-core processor. The multi-core processor may include a first set of cores with a first size. The multi-core processor may also include a second set of cores with a second size different from the first size. The systems may also include a memory configured to be in communication with the multi-core processor. The multi-core processor may be configured to receive the job at an arrival time. The job may include a request to execute a set of instructions. The multi-core processor may also be configured to determine a job arrival rate of the job based on the arrival time of the job. The job arrival rate may indicate a frequency that the multi-core processor receives a plurality of jobs including the job. The multi-core processor may also be configured to select the first set of cores and select a degree of parallelism based on the job arrival rate and based on a performance metric. The degree of parallelism may relate to a number of parallel threads associated with execution of the request. The performance metric may relate to the execution of the job on the first set of cores using the degree of parallelism. The multi-core processor may also be configured to, in response to the selection of the first set of cores, assign the job to be executed on the first set of cores.

In some examples, multi-core processors configured to assign a job to a first set of cores in the multi-core processor are generally described. The multi-core processors may include the first set of cores with a first size. The multi-core processors may also include a second set of cores with a second size different from the first size. The multi-core processors may also include a memory configured to be in communication with the first set of cores and with the second set of cores. A particular core among the second set of cores may be configured to receive the job at an arrival time. The job may include a request to execute a set of instructions. The particular core may also be configured to determine a job arrival rate of the job based on the arrival time of the job. The job arrival rate may indicate a frequency that the multi-core processor receives a plurality of jobs including the job. The particular core may also be configured to select the first set of cores and selecting a degree of parallelism based on the job arrival rate and based on a performance metric. The degree of parallelism may relate to a number of parallel threads associated with execution of the request. The performance metric may relate to the execution of the job on the first set of cores using the degree of parallelism. The particular core may also be configured to, in response to the selection of the first set of cores, assign the job to be executed on the first set of cores.

In some examples, multi-core processors configured to execute a job on a first set of cores are generally described. The multi-core processors may include a memory. The multi-core processors may also include a first set of cores with a first size. The multi-core processors may also include a second set of cores with a second size different from the first size. The multi-core processors may include a switch configured to be in communication with the first set of cores, the second set of cores, and the memory. The multi-core processors may also include a power receiver configured to be in communication with the first set of cores, the second set of cores, and the memory. In response to a receipt of a selection signal at the switch, the switch may be configured to activate the first set of cores to execute the job.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
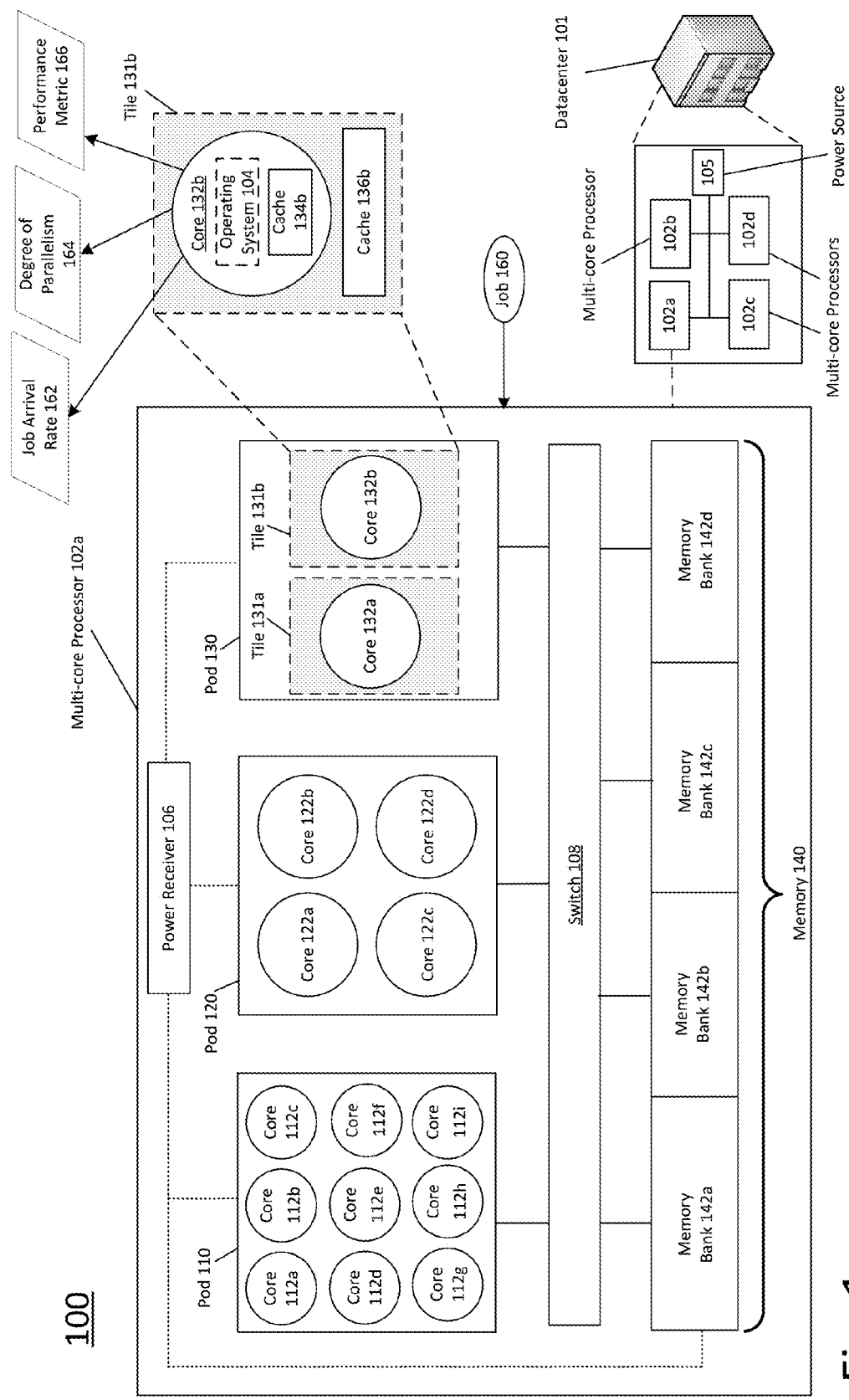
FIG. 1 illustrates an example system that can be utilized to implement job assignment in a multi-core processor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to job assignment in a multi-core processor.

Briefly stated, technologies are generally described for methods and systems effective to assign a job to be executed in a multi-core processor. The methods may include receiving the job at the multi-core processor at an arrival time. The multi-core processor may include a first set of cores with a first size. The multi-core processor may also include a second set of cores with a second size different from the first size. The job may include a request to execute a set of instructions. The methods may also include determining a job arrival rate of the job based on the arrival time of the job. The job arrival rate may indicate a frequency that the multi-core processor receives a plurality of jobs including the job. The methods may also include selecting the first set of cores and selecting a degree of parallelism based on the job arrival rate and based on a performance metric. The degree of parallelism may relate to a number of parallel threads associated with execution of the request. The performance metric may relate to the execution of the job on the first set of cores using the degree of parallelism. The methods may also include, in response to the selection of the first set of cores, assigning the job to be executed on the first set of cores.

FIG. 1 illustrates an example system 100 that can be utilized to implement job assignment in a multi-core processor, arranged in accordance with at least some embodiments described herein. System 100 may be implemented in a datacenter 101 and may include one or more multi-core processors 102a, 102b, 102c, 102d. In some examples, multi-core processors 102a, 102b, 102c, 102d may each be a part of a respective server among a plurality of servers in datacenter 101. Multi-core processors 102a, 102b, 102c, 102d may be configured to be in communication with each other. Datacenter 101 may include a power source 105, such as a power generator, configured to provide power to multi-core processors 102a, 102b, 102c, 102d.

Multi-core processors 102a, 102b, 102c, 102d may include the same components. Focusing on multi-core processor 102a, multi-core processor 102a may include one or more pods 110, 120, 130, a power receiver 106, a switch 108, and/or a memory 140. Power receiver 106 may receive power provided by power source 105 and, in response, may allocate the received power to a pod among pods 110, 120, 130 based on a selection of a pod (described below). Power receiver 106 may further be configured to allocate power to memory 140.

Switch 108 may be, for example, a multiplexer and may be configured to be in communication with pods 110, 120, 130 and/or memory 140. Switch 108 may be configured to receive selection signals that may be effective to activate one pod among pods 110, 120, 130 (described below). Memory 140 may be a cache, such as a low-level cache such as a level three (L3) cache that is effective to store data relating to operations of multi-core processor 102a. Memory 140 may include one or more one or more memory banks 142a, 142b, 142c, 142d. Switch 108 may be further configured to receive selection signals that may be effective to activate at least one memory bank among memory banks 142a, 142b, 142c, 142d based on a selection of a pod (described below).

Each pod among pods 110, 120, 130 may include a respective set of processor cores ("cores"). Pods 110, 120, 130 may include a same or different number of cores. In the example depicted, pod 110 may include nine cores 112 (e.g. 112a, 112b, 112c, 112d, 112e, 112f, 112g, 112h, 112i). Pod 120 may include four cores 122 (e.g. 122a, 122b, 122c, 122d). Pod 130 may include two cores 132 (e.g. 132a, 132b). Each pod among pods 110, 120, 130 may include cores of a same core size. In some examples, core size may refer to a nominal frequency that relates to operating frequency of a core. For example, cores in pod 110 may be configured to operate under a nominal frequency of 2.0 gigahertz (GHz), cores in pod 120 may be configured to operate under a nominal frequency of 2.2 GHz, and cores in pod 130 may be configured to operate under a nominal frequency of 2.4 GHz. In some examples, core size may refer to a dispatch width that relates to a number of instructions that may be executed simultaneously on a core. In some examples, core size may refer to a window size that relates to storage of instructions that are waiting to be returned from a core. In some examples, core size may refer to a peak power consumption of a core. In some examples, core size may refer to cache size of a data cache or an instruction cache associated with a core.

Each pod may include at least one tile where each tile includes a core and/or one or more modules of memory such as cache. Focusing on pod 130, pod 130 may include a tile 131a and a tile 131b. Tile 131a may include core 132a and tile 131b may include core 132b. Focusing on tile 131b, tile 131b may further include a cache 134b and a cache 136b. In examples where cache 134b is a level one (L1) cache, cache 134b may be a part of core 132b. Cache 134b, 136b may be configured to store data relating to operations of core 132b. Core 132b may be configured to be in communication with cache 134b and/or cache 136b. Core 132b may be configured to execute jobs and/or threads issued by an operating system 104 or jobs received at multi-core processor 102a. Operating system 104 may be an operating system effective to facilitate operations of multi-core processor 102a and/or datacenter 101.

In an example, datacenter 101 may receive a job 160 from an entity such as a device configured to be in communication with datacenter 101. A processor of datacenter 101 may assign job 160 to a multi-core processor such as multi-core processor 102a. Job 160 may include a request to execute a set of instructions relating to contents stored in datacenter 101. For example, when datacenter 101 is a datacenter for a host domain such as xyz.com, job 160 may include a request to execute instructions to search for particular content and/or files relating to webpages of xyz.com.

As will be described in more detail below, job 160 may arrive at multi-core processor 102a at an arrival time. Core 132b, which may be assigned to execute operating system 104, may determine a job arrival rate 162 based on the arrival time of job 160 at multi-core processor 102a. Job arrival rate 162 may indicate a frequency that multi-core processor 102a receives jobs such as job 160. Core 132b may select a pod among pods 110, 120, 130, and may select a degree of parallelism 164, based on job arrival rate 162 and based on a performance metric 166. Degree of parallelism 164 may relate to a number of parallel threads associated with execution of requests of job 160. Performance metric 166 may relate to parameters associated with an execution of job 160 such as a mean execution time. In response to selection of a pod among pods 110, 120, 130, core 132b may assign job 160 to be executed on the selected pod.

Figure 2:
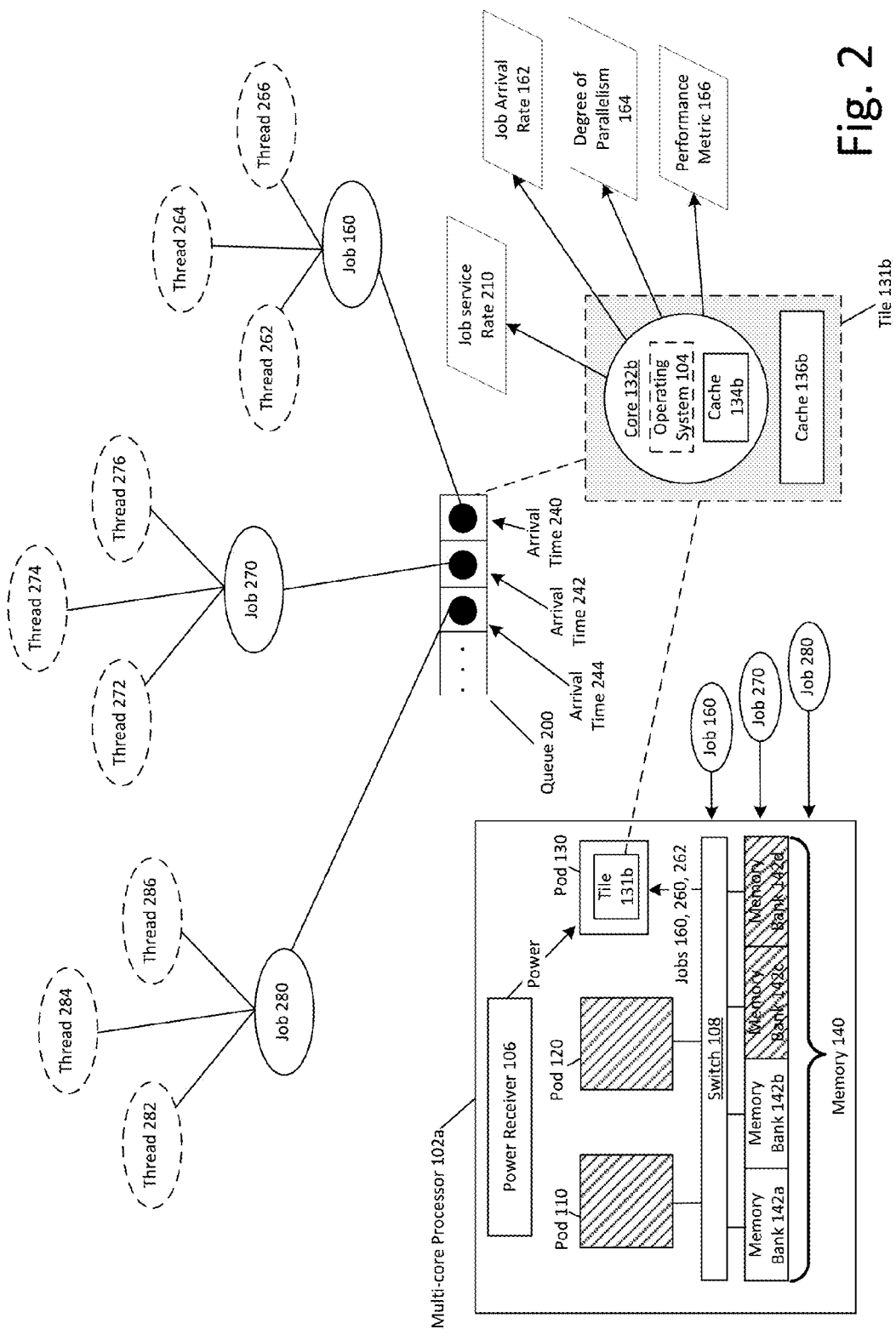
FIG. 2 illustrates the example system of FIG. 1 with additional details relating to selection of a pod.

FIG. 2 illustrates an example system 100 of FIG. 1 with additional details relating to selection of a pod, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

As will be explained in more detail below, core 132b may determine job arrival rate 162 based on arrival times of one or more jobs received at multi-core processor 102a. Core 132b may analyze threads associated with jobs received at multi-core processor 102a and may determine a number of threads for a respective job that may be executed in parallel. In response to the determination of job arrival rate 162 and the number of threads that may be executed in parallel, core 132b may determine at least one performance value of performance metric 166. Core 132b may further compare the determined performance values and, in response, may select a pod and a degree of parallelism based on the comparison.

In the example, pod 130 may be activated and core 132b may be assigned to execute operating system 104 and execute jobs being received at multi-core processor 102a. Pods 110, 120 may be deactivated (depicted by the shading) when pod 130 is activated. In some examples, a portion of memory 140, such as memory banks 142a, 142b, may be activated to facilitate execution of operating system 104 and jobs on pod 130. Memory banks 142c, 142d may be deactivated (depicted by the shading) if activation of memory banks 142a, 142b is determined, such as by core 132b, to be sufficient for execution of operating system 104 and jobs on pod 130. When pod 130 is activated, power receiver 106 may allocate power received at multi-core processor 102a to pod 130.

In the example, multi-core processor 102a may receive jobs 160, 270, 280 at arrival times 240, 242, 244, respectively. Jobs 160, 270, 280 may each be associated with at least one thread associated with execution of requests of a respective job. For example, job 160 may be associated with threads 262, 264, 266. Job 270 may be associated with threads 272, 274, 276. Job 280 may be associated with threads 282, 284, 286. A queue 200, which may be stored in cache 134b or cache 136b, may store incoming jobs at multi-core processor 102a when core 132b is not available to execute the incoming jobs. Queue 200 may be of an arbitrary size and may store one or more jobs. Queue 200 may be a queue of a particular queueing model such as a M/M/n queue, where jobs are expected to arrive based on a Poisson process. Queue 200 may also store indications of arrival times 240, 242, 244 of jobs 160, 270, 280.

Core 132b may analyze jobs stored in queue 200 and may use arrival times 240, 242, 244 to determine job arrival rate 162. In some examples, operating system 104 may include instructions to command core 132b to analyze jobs stored in queue 200 periodically. Core 132b may analyze queue 200 and may determine that a total of three jobs, jobs 160, 270, 280, are received at pod 130 between a first millisecond and a thirteenth millisecond. When queue 200 is a M/M/n queue, based on a time interval (thirteen milliseconds) and a number of jobs in queue 200 (three jobs), core 132b may determine job arrival rate 162 based on instructions relating to a Poisson process.

In the example, performance metric 166 may be a mean service time relating to an expected service time of jobs 160, 270, 280. Mean service time of jobs 160, 270, 280 may be based on job arrival rate 162 and a job service rate 210 that relates to an expected number of jobs that may be executed per second. Job service rate 210 may be based on a number of parallel threads associated with jobs 160, 270, 280. Parallel threads may be threads that may be executed in parallel. When performance metric 166 is a mean service time of jobs 160, 270, 280, after determination of job arrival rate 162, core 132b may determine a number of parallel threads among threads 262, 264, 266, 272, 274, 276, 282, 284, 286 associated with jobs 160, 270, 280.

For example, core 132b may determine that threads 262, 264, 272, 274, 282, 284 are parallel threads, and threads 266, 276, 286 are serial threads, where serial threads are threads that cannot be executed in parallel. Based on the determination, core 132b may determine a percentage, such as 66.66%, that indicates a percentage of parallel executions during execution of each of jobs 160, 270, 280. Core 132b may determine at least one value of job service rate 210 in an iterative manner using the percentage of parallel execution and at least one value of degree of parallelism 164. The at least one value of degree of parallelism 164 may be an integer. A degree of parallelism of one may indicate executing jobs by executing one thread at a time. A degree of parallelism of two may indicate executing jobs by executing two threads at a time. As the percentage of parallel execution increases, a value of job service rate 210 may also increase.

In response to the determination of job arrival rate 162 and job service rate 210, core 132b may determine at least one performance value of mean service time in an iterative manner using job arrival rate 162, job service rate 210, and at least one value of degree of parallelism 164. For example, core 132b may determine a first mean service time relating to execution of jobs 160, 270, 280 on the set of cores in pod 110 using a first value of degree of parallelism 164. Core 132b may determine a second mean service time relating to execution of jobs 160, 270, 280 on the set of cores in pod 110 using a second value of degree of parallelism 164. Core 132b may determine subsequent mean service times relating to execution of jobs 160, 270, 280 on each set of cores such as cores in pod 120 and cores in pod 130, using the first, second, and subsequent values of degree of parallelism 164.

Selection of a pod may be further based on a number of cores in each pod. For example, core 132b may not determine a mean service time relating to execution of jobs 160, 270, 280 on pod 130 using a degree of parallelism of three or greater because pod 130 includes two cores. Similarly, core 132b may not determine a mean service time relating to execution of jobs 160, 270, 280 on pod 120 using a degree of parallelism of five or greater because pod 120 includes four cores.

Figure 3:
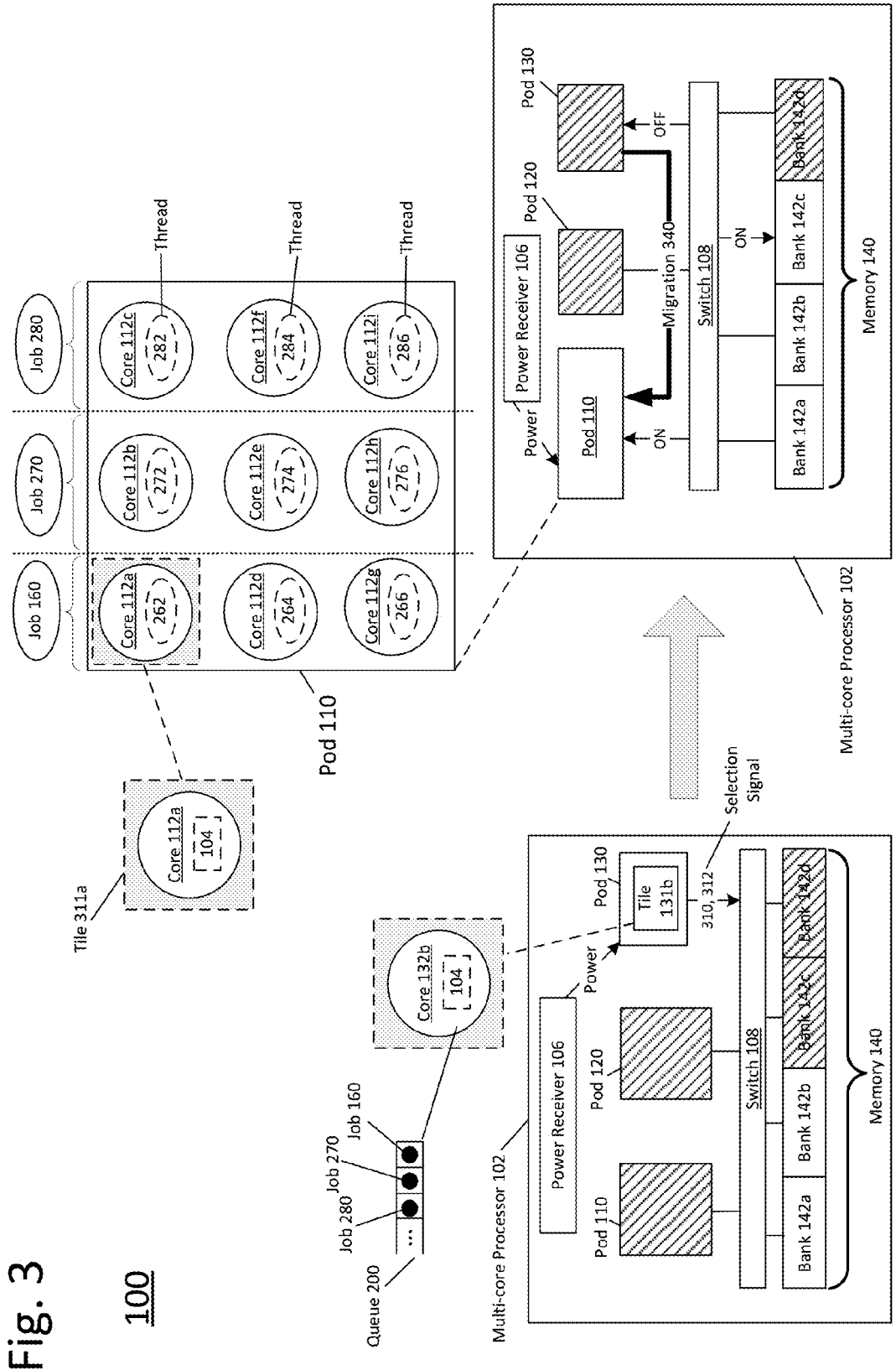
FIG. 3 illustrates the example system of FIG. 1 with additional details relating to assigning jobs to a selected pod.

FIG. 3 illustrates example system 100 of FIG. 1 with additional details relating to assigning jobs to a selected pod, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

In response to a selection of a pod and degree of parallelism 164, core 132b may assign jobs 160, 270, 280 to the selected pod. The selected pod may execute jobs 160, 270, 280 using the selected degree of parallelism. Also in response to the selection of the pod, multi-core processor 102a may perform a migration 340 that may migrate operating system 104 to the selected pod and one or more memory banks of memory 140 may be activated or deactivated.

Based on the comparison of the determined mean service times (described above), in the example, core 132b may select pod 110 to execute jobs 160, 270, 280 using a selected value of degree of parallelism 164. In response to selection of pod 110, core 132b may first identify outstanding jobs in pod 130. If there are outstanding jobs in pod 130, cores in pod 130 may execute the outstanding jobs and core 132b may store incoming jobs in queue 200. In response to a completion of the outstanding jobs assigned to pod 130, core 132b may activate pod 110 by sending a selection signal 310 to switch 108. Switch 108 may receive selection signal 310 and in response, may activate pod 110. Core 132b may perform migration 340 in response to the activation of pod 110 to migrate operating system 104 and jobs stored in queue 200 to pod 110. In response to a completion of migration 340, switch 108 may deactivate pod 130. During migration 340, core 132b may send an indication of the selected value of degree of parallelism 164 to pod 110.

In response to a completion of migration 340, a core in pod 110, such as core 112a, may be assigned to execute operating system 104. Core 112a may assign threads to each core in pod 110 based on the selected value of degree of parallelism 164 and based on the determined number of parallel threads (described above). In an example, a selected value of degree of parallelism 164 may be "9" and threads 262, 264, 266, 272, 274, 276, 282, 284, 286 may be parallel threads. Core 112a may assign threads 262, 264, 266, 272, 274, 276, 282, 284, 286 to cores in pod 110 to be executed simultaneously based on the selected value of degree of parallelism 164 and the determined number of parallel threads.

In some examples, prior to assigning threads to cores in pod 110, core 112a may determine an amount of memory required for an execution of jobs 160, 270, 280. In the example, memory banks 142a, 142b are activated prior to migration 340 and memory banks 142c, 142d may be deactivated prior to migration 340. After migration 340, core 112a may determine that the activated memory banks 142a, 142b in memory 140 may not provide sufficient memory capacity for the execution of jobs 160, 270, 280. In response to the determination that the activated memory banks 142a, 142b may not provide sufficient memory capacity, core 112a may identify a portion of memory 140, such as a deactivated portion, and in response, may activate memory banks associated with the identified portion of memory 140 in order to execute jobs 160, 270, 280. In the example, core 112a may activate memory bank 142c by sending a selection signal 312 to switch 108. Switch 108 may receive selection signal 312 and in response, may activate memory bank 142c. In some examples, prior to migration 340, power receiver 106 may allocate power received at multi-core processor 102a to pod 130. In response to the selection of pod 110 to execute jobs 160, 270, 280, power receiver 106 may allocate power to pod 110 instead of pod 130.

Among other possible benefits, a system in accordance with the disclosure may benefit systems that may utilize multi-core processors. The system may reduce unnecessary power consumption by the multi-core processor by maximizing core usage within a multi-core processor. For example, a selection of a first pod where all cores within the first pod may be utilized may result in reduced unnecessary power consumption compared to a selection of a second pod where not all cores within the second pod may be utilized. The system may also provide continuous adjustment in power consumption by the multi-core processor. As jobs arrive at the multi-core processor at different arrival times, the system may select different pods at different times in order to reduce unnecessary power consumption by the multi-core processor.

Figure 4:
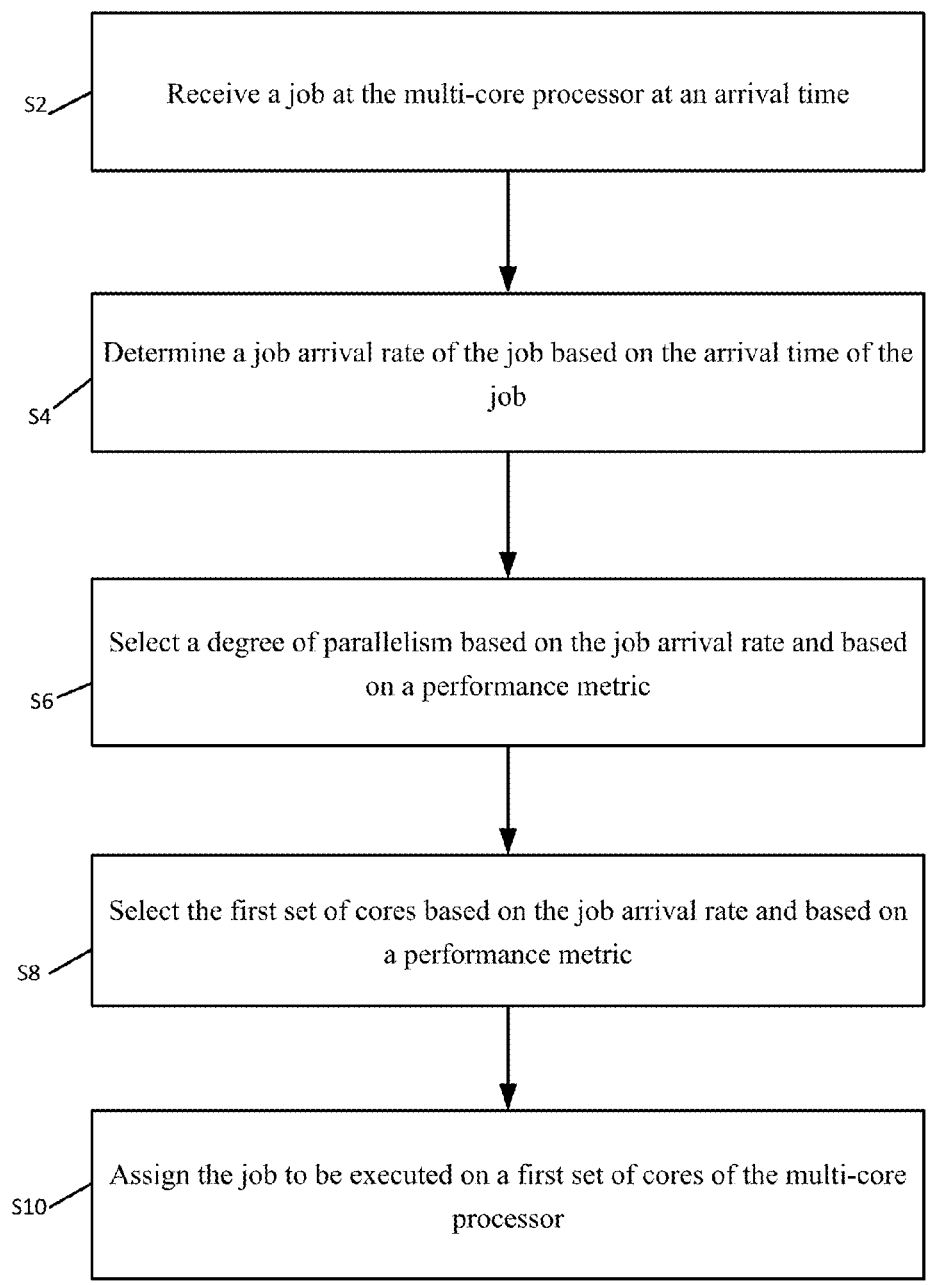
FIG. 4 illustrates a flow diagram for an example process for implementing job assignment in a multi-core processor.

FIG. 4 illustrates a flow diagram for an example process for implementing job assignment in a multi-core processor, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Receive a job at the multi-core processor at an arrival time". At block S2, a multi-core processor may receive a job at an arrival time. The multi-core processor may include a first set of cores with a first size. The multi-core processor may also include a second set of cores with a second size different from the first size. The job may include a request to execute a set of instructions.

Processing may continue from block S2 to block S4, "Determine a job arrival rate of the job based on the arrival time of the job". At block S4, the multi-core processor may determine a job arrival rate based on the arrival time of the job. The job arrival rate may indicate a frequency that the multi-core processor receives a plurality of jobs including the job.

Processing may continue from block S4 to block S6, "Select a degree of parallelism based on the job arrival rate and based on a performance metric". At block S6, the multi-core processor may select a degree of parallelism based on the job arrival rate and based on a performance metric. The degree of parallelism may relate to a number of parallel threads associated with execution of the request. The performance metric may relate to the execution of the job on the first set of cores using the degree of parallelism. In some examples, the performance metric may be a mean service time associated with the job.

Processing may continue from block S6 to block S8, "Select the first set of cores based on the job arrival rate and based on a performance metric". At block S8, the multi-core processor may select the first set of cores based on the job arrival rate and based on a performance metric. In some examples, the selection of the first set of cores may be further based on a number of cores of the first size in the multi-core processor.

Processing may continue from block S8 to block S10, "Assign the job to be executed on a first set of cores of the multi-core processor". At block S8, the multi-core processor may assign the job to be executed on the first set of cores of the multi-core processor. In some examples, in response to the assignment of the job to be executed on the first set of cores, the multi-core processor may allocate power to the first set of cores. Prior to assigning the jobs to be executed on the first set of cores, the multi-core processor may identify outstanding jobs assigned to the second set of cores. In response to the identification of the outstanding jobs, the multi-core processor may execute the outstanding jobs on the second set of cores. In response to a completion of the execution of the outstanding jobs on the second set of cores, the multi-core processor may deactivate the second set of cores. In some examples, in response to the completion of execution of the outstanding jobs, the multi-core processor may migrate an operating system to a particular core among the first set of cores.

Figure 5:
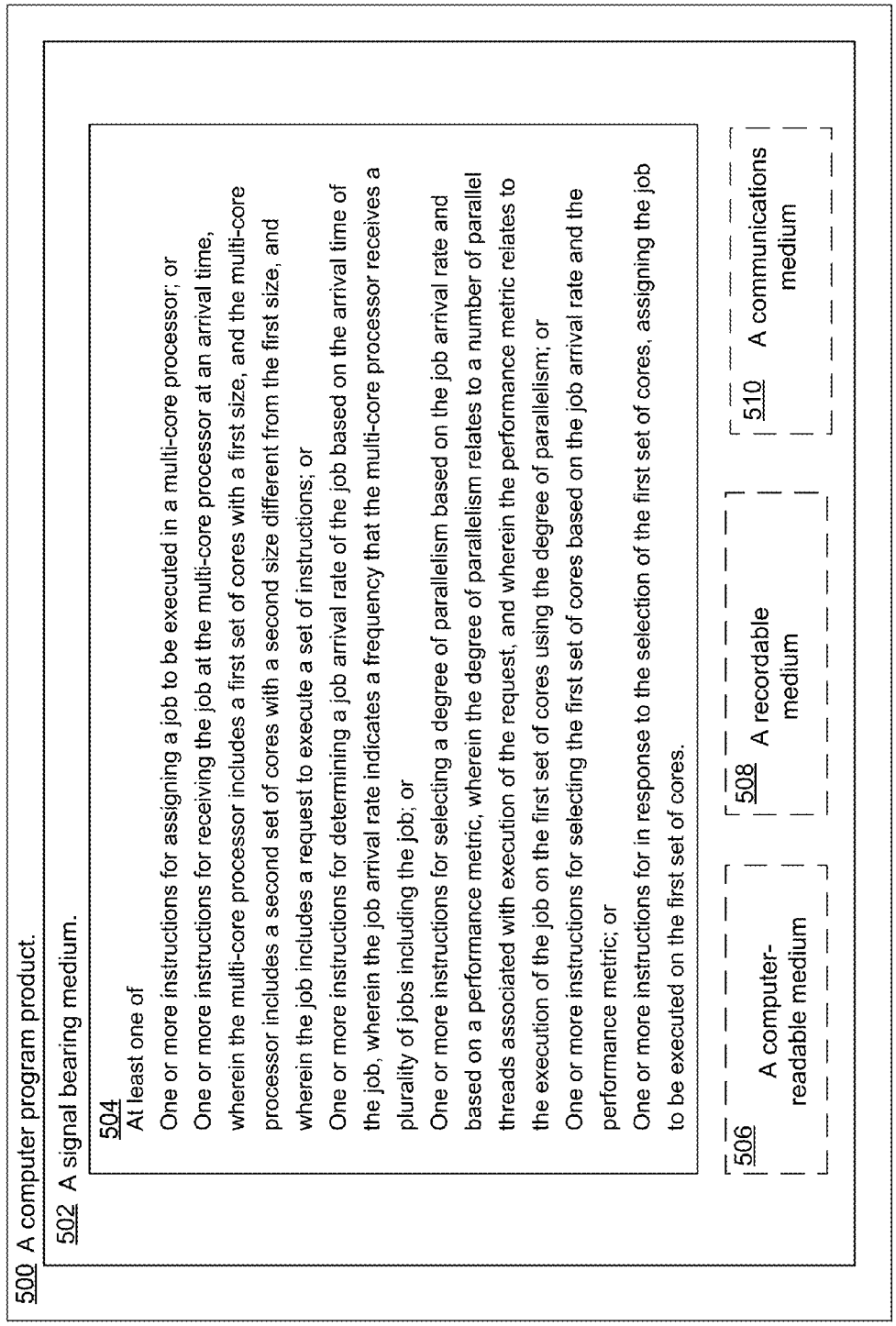
FIG. 5 illustrates an example computer program product that can be utilized to implement job assignment in a multi-core processor.

FIG. 5 illustrates an example computer program product 500 that can be utilized to implement job assignment in a multi-core processor, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, multi-core processors 102a, 102b, 102c, 102d may undertake one or more of the blocks shown in FIG. 5 in response to instructions 504 conveyed to the system 100 by signal bearing medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
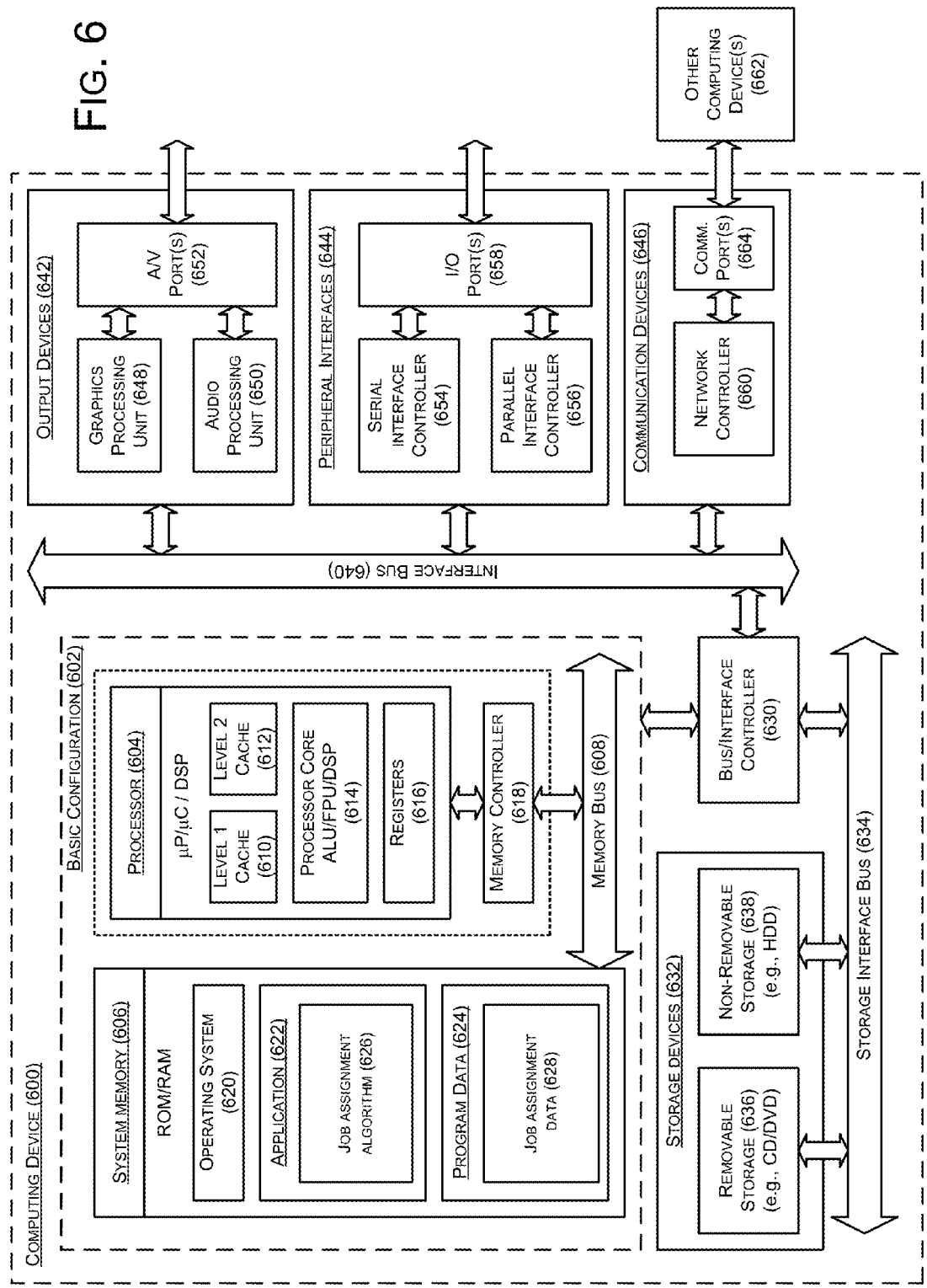
FIG. 6 is a block diagram illustrating an example computing device that is arranged to implement job assignment in a multi-core processor, all arranged according to at least some embodiments described herein.

FIG. 6 is a block diagram illustrating an example computing device 600 that is arranged to implement job assignment in a multi-core processor, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a job assignment algorithm 626 that is arranged to perform the functions as described herein including those described with respect to system 100 of FIGS. 1-5. Program data 624 may include job assignment data 628 that may be useful for implementation of job assignment in a multi-core processor as is described herein. In some embodiments, application 622 may be arranged to operate with program data 624 on operating system 620 such that implementations of job assignment in multi-core processor may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

Some example systems (such as multi-core processor architectures) and some example methods allow an improved (or, in some examples, substantially optimized) degree of parallelism to be selected for processing a job, the degree of parallelism being selected based upon the job arrival rate. Example systems include a data center capable of handling large variations in job arrival rate with a reduced mean service time. In some examples, an optimum level of parallelism for processing a job is selected based on the job arrival rate, for example with the degree of parallelism increasing with decrease in the job arrival rate. An example system, such as a dark silicon multiprocessor architecture, includes a run-time scheduler configured to select a core type for job assignments that is optimized under a full-chip power budget to the job arrival rate at that time.

An example system, such as a multi-core processor architecture, comprises a plurality of processing pods, for example where each pod represents a separate multi-core processor, with different numbers and sizes of processors in each pod. In some examples, a plurality of processing pods may include a first number of small cores, a second number of medium sized cores, and a third number of large cores. In this context, small, medium, and large may refer to relative sizes of cores. In some examples, the first number is greater or equal to the second number, and the second number is greater or equal to the third number. In some examples, cores in a pod have private L1/L2 caches, and in some examples the pods may share one or more banks of last-level caches of varying sizes, and may communicate with the caches through an interconnect. In some examples, each pod is micro-architecturally different from the other pods. In some examples, only one pod is turned on at any time. In some examples, pods share a last level cache (LLC).

In some examples, a pod may be selected for processing by the run-time scheduler at a particular time, and the other pods are power gated. Each pod may be designed to expend the core power budget of the chip, and the pod may be chosen (from a plurality of heterogeneous pods) to reduce (e.g. approximately or substantially minimize) service time based on the job arrival rate at the time of selection.

In some examples, a system (such as a multi-core processor) comprises a plurality of pods, where each pod may comprise a plurality of processing cores. In some examples, the processing cores in each pod may be identical. In some examples, the system includes private caches for each core. In some examples, the core type used in a pod is different from the core type used in any other pod on the chip, so that cores are micro-architecturally homogeneous within a pod but heterogeneous across pods. In some examples, each pod is designed to consume the full power budget of the chip (excluding non-core components), and in some examples only one pod is switched on at any given time while the other pods remain dark. Some examples comprise a globally shared LLC with multiple banks and support for per-bank power gating, allowing for the LLC cache capacity to be changed dynamically at run-time, and at any given time part of the LLC may be dark. Some examples include a run-time scheduler that monitors the job arrival rate and determines which pod to utilize, the optimal degree of parallelism and number of jobs to run in parallel on that pod, and in some examples the number of banks of the LLC to turn on. The run-time scheduler may reduce, and in some examples substantially minimize, the mean service time of jobs within a peak power budget.

Experimental results were obtained using a cycle-accurate multi-core simulation and an in-house discrete event simulation (DES) engine, and showed that the optimal degree of parallelism, type of pod used and LLC capacity depended on the job arrival rate. Even in the absence of any diversity in job application characteristics, examples of the present disclosure (such as micro-architecturally heterogeneous dark silicon processors) show improved performance when there are arrival rate variations. Examples also include data centers that serve homogeneous workloads, for example a data center that serves web search queries, where there may be little application heterogeneity.

Some example systems comprise a globally shared LLC that is partitioned into banks. Each bank may be individually power gated, allowing dynamic control of LLC capacity. In some examples, increased cache capacity may be needed for lower degree of parallelisms and a higher number of parallel jobs. The system may be configured to dynamically control the cache capacity based on the degree of parallelism and the number of parallel jobs. In some examples, as the number of banks of the LLC that are switched on increase, the frequency of the cores may be reduced to compensate for the increase in LLC power consumption. In some examples, the LLC implements a write-through policy and is therefore generally consistent with the main memory. In some examples, if the run-time scheduler decides to switch off one or more banks, the run-time scheduler invalidates all the data in the LLC and updates the cache indexing policy to indicate the reduced cache capacity. Starting with a cold LLC may incur a performance overhead, but even taking that into account, improvements were observed through simulations. Based on the job arrival rate, the run-time scheduler may decide at intervals which pod to utilize and the optimal degree of parallelism for that pod, and optionally may also decide at intervals the LLC cache capacity. In some examples, the run-time scheduler may predict future values of job characteristics and/or job arrival rate, for example using time, historic data, or other approach or combination thereof. In some examples, a run-time scheduler may be configured to implement an online policy that estimates future values and/or future variations of job characteristics, and/or future values and/or future variations job arrival rate. In some examples, a job arrival rate may be estimated for a subsequent time interval, and the degree of parallelism used for that time interval selected based on the estimated job arrival rate.

In some examples, a job arrival rate may be determined as an average over a time period, and in non-limiting examples the time period may be a time period in the range 1 second to 10 minutes, for example in the range 10 seconds-5 minutes. In some examples, the job arrival rate may be determined from the time during which a predetermined number of jobs arrive. In some examples, job arrival rate may be determined a rolling average of a parameter as described above. In some examples, ranges may be approximate.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to assign a job to be executed in a multi-core processor, the method comprising, by the multi-core processor:

receiving the job at the multi-core processor at an arrival time, wherein the multi-core processor includes a first set of cores with a first size, and the multi-core processor includes a second set of cores with a second size different from the first size, and wherein the job includes a request to execute a set of instructions;

determining a job arrival rate of the job based on the arrival time of the job, wherein the job arrival rate indicates a frequency that the multi-core processor receives a plurality of jobs including the job;

selecting a degree of parallelism based on the job arrival rate and based on a performance metric, wherein the degree of parallelism relates to a number of parallel threads associated with execution of the request, and wherein the performance metric relates to the execution of the job on the first set of cores using the degree of parallelism;

selecting the first set of cores based on the job arrival rate and the performance metric;

identifying outstanding jobs assigned to the second set of cores;

executing the outstanding jobs on the second set of cores;

deactivating the second set of cores in response to a completion of execution of the outstanding jobs on the second set of cores;

migrating an operating system to a particular core among the first set of cores; and in response to the selection of the first set of cores, assigning the job to be executed on the first set of cores.

2. The method of claim 1, wherein selection of the first set of cores is further based on a number of cores of the first size in the multi-core processor.

3. The method of claim 1, wherein the performance metric is a mean service time associated with the job.

4. The method of claim 1, further comprising, in response to the assignment of the job to be executed on the first set of cores, allocating power to the first set of cores.

5. The method of claim 1, wherein the selected degree of parallelism is a first degree of parallelism, and selecting the first set of cores and selecting the first degree of parallelism further comprises:
   determining a first performance value of the performance metric, wherein the first performance value relates to execution of the job on the first set of cores using the first degree of parallelism;
   determining a second performance value of the performance metric, wherein the second performance value relates to execution of the job on the first set of cores using a second degree of parallelism;
   determining a third performance value of the performance metric, wherein the third performance value relates to execution of the job on the second set of cores using the first degree of parallelism;
   determining a fourth performance value of the performance metric, wherein the fourth performance value relates to execution of the job on the second set of cores using the second degree of parallelism; and
   comparing the first, second, third, and fourth performance values.

6. The method of claim 1, further comprising:
   identifying a portion of a memory based on the selection of the first set of cores; and
   in response to the identification of the portion of the memory, activating memory banks associated with the portion of the memory.

7. A system effective to assign a job to be executed in a multi-core processor, the system comprising:
   the multi-core processor, wherein the multi-core processor comprises a first set of cores with a first size and comprises a second set of cores with a second size different from the first size; and
   a memory configured to be in communication with the multi-core processor;
   wherein the multi-core processor is configured to:
      receive the job at an arrival time, wherein the job includes a request to execute a set of instructions;
      determine a job arrival rate of the job based on the arrival time of the job, wherein the job arrival rate indicates a frequency that the multi-core processor receives a plurality of jobs including the job;
      select a degree of parallelism based on the job arrival rate and based on a performance metric, wherein the degree of parallelism relates to a number of parallel threads associated with execution of the request, and wherein the performance metric relates to the execution of the job on the first set of cores using the degree of parallelism;
      select the first set of cores based on the job arrival rate and the performance metric;
      identify outstanding jobs assigned to the second set of cores;
      execute the outstanding jobs on the second set of cores;
      deactivate the second set of cores in response to a completion of execution of the outstanding jobs on the second set of cores;
      migrate an operating system associated with a first particular core among the second set of cores to a second particular core among the first set of cores; and
      in response to the selection of the first set of cores, assign the job to be executed on the first set of cores.

8. The system of claim 7, wherein the selected degree of parallelism is a first degree of parallelism, and the multi-core processor is further configured to:
   determine a first performance value of the performance metric, wherein the first performance value relates to execution of the job on the first set of cores using the first degree of parallelism;
   determine a second performance value of the performance metric, wherein the second performance value relates to execution of the job on the first set of cores using a second degree of parallelism;
   determine a third performance value of the performance metric, wherein the third performance value relates to execution of the job on the second set of cores using the first degree of parallelism;
   determine a fourth performance value of the performance metric, wherein the fourth performance value relates to execution of the job on the second set of cores using the second degree of parallelism; and
   compare the first, second, third, and fourth performance values.

9. The system of claim 7, wherein the multi-core processor is further configured to:
   identify a portion of the memory based on the selection of the first set of cores; and
   in response to the identification of the portion of the memory, activate memory banks associated with the portion of the memory.

10. A multi-core processor configured to assign a job to a first set of cores in the multi-core processor, the multi-core processor comprising:
   the first set of cores with a first size;
   a second set of cores with a second size different from the first size;
   a memory configured to be in communication with the first set of cores and with the second set of cores;
   wherein a particular core among the second set of cores is configured to:
      receive the job at an arrival time, wherein the job includes a request to execute a set of instructions;
      determine a job arrival rate of the job based on the arrival time of the job, wherein the job arrival rate indicates a frequency that the multi-core processor receives a plurality of jobs including the job;
      select a degree of parallelism based on the job arrival rate and based on a performance metric, wherein the degree of parallelism relates to a number of parallel threads associated with execution of the request, and wherein the performance metric relates to the execution of the job on the first set of cores using the degree of parallelism;
      select the first set of cores based on the job arrival rate and the performance metric;
      identify outstanding jobs assigned to the second set of cores;
      execute the outstanding jobs on the second set of cores;
      deactivate the second set of cores in response to a completion of execution of the outstanding jobs on the second set of cores;
      migrate an operating system associated with a first particular core among the second set of cores to a second particular core among the first set of cores; and in response to the selection of the first set of cores, assign the job to be executed on the first set of cores.

11. The multi-core processor of claim 10, wherein prior to the assignment of the job to be executed on the first set of cores, the particular core is further configured to deactivate the second set of cores.

12. The multi-core processor of claim 11, wherein prior to deactivation of the second set of cores, the particular core is further configured to:
identify outstanding jobs assigned to the second set of cores;
execute the outstanding jobs on the second set of cores; and
wherein deactivation of the second set of cores is performed in response to a completion of execution of the outstanding jobs on the second set of cores.

13. The multi-core processor of claim 10, wherein the selected degree of parallelism is a first degree of parallelism, and the particular core is further configured to:
determine a first performance value of the performance metric, wherein the first performance value relates to execution of the job on the first set of cores using the first degree of parallelism;
determine a second performance value of the performance metric, wherein the second performance value relates to execution of the job on the first set of cores using a second degree of parallelism;
determine a third performance value of the performance metric, wherein the third performance value relates to execution of the job on the second set of cores using the first degree of parallelism;
determine a fourth performance value of the performance metric, wherein the fourth performance value relates to execution of the job on the second set of cores using the second degree of parallelism; and
compare the first, second, third, and fourth performance values.

14. The multi-core processor of claim 10, wherein the particular core is further configured to:
identify a portion of the memory based on the selection of the first set of cores;
in response to the identification of the portion of the memory, activate memory banks associated with the portion of the memory; and
deactivate memory banks dissociated with the portion of the memory.

15. A multi-core processor configured to execute a job on a first set of cores, the multi-core processor comprising:
a memory;
the first set of cores with a first size;
a second set of cores with a second size different from the first size;
a switch configured to be in communication with the first set of cores, the second set of cores, and the memory; and
a power receiver configured to be in communication with the first set of cores, the second set of cores, and the memory;
wherein a particular core among the second set of cores is configured to:
receive a job at an arrival time, wherein the job includes a request to execute a set of instructions;
determine a job arrival rate of the job based on the arrival time of the job, wherein the job arrival rate indicates a frequency that the multi-core processor receives a plurality of jobs including the job;
select a degree of parallelism based on the job arrival rate and based on a performance metric, wherein the degree of parallelism relates to a number of parallel threads associated with execution of the request, and wherein the performance metric relates to the execution of the job on the first set of cores using the degree of parallelism;
select the first set of cores based on the job arrival rate and the performance metric;
send a selection signal to the switch in response to a completion of execution of the outstanding jobs on the second set of cores;
the switch is configured to:
receive the selection signal;
in response to the receipt of the selection signal, activate the first set of cores to execute the job; and
deactivate the second set of cores in response to a completion of a migration of an operating system associated with a first particular core among the second set of cores to a second particular core among the first set of cores.

16. The multi-core processor of claim 15, wherein the selection signal is a first selection signal, and in response to a receipt of a second selection signal, the switch is further configured to activate one or more memory banks of the memory.

17. The multi-core processor of claim 15, wherein, in response to the selection of the first set of cores, the power receiver is configured to allocate power to the first set of cores.

* * * * *